United States Patent Office 2,852,126
Patented Sept. 16, 1958

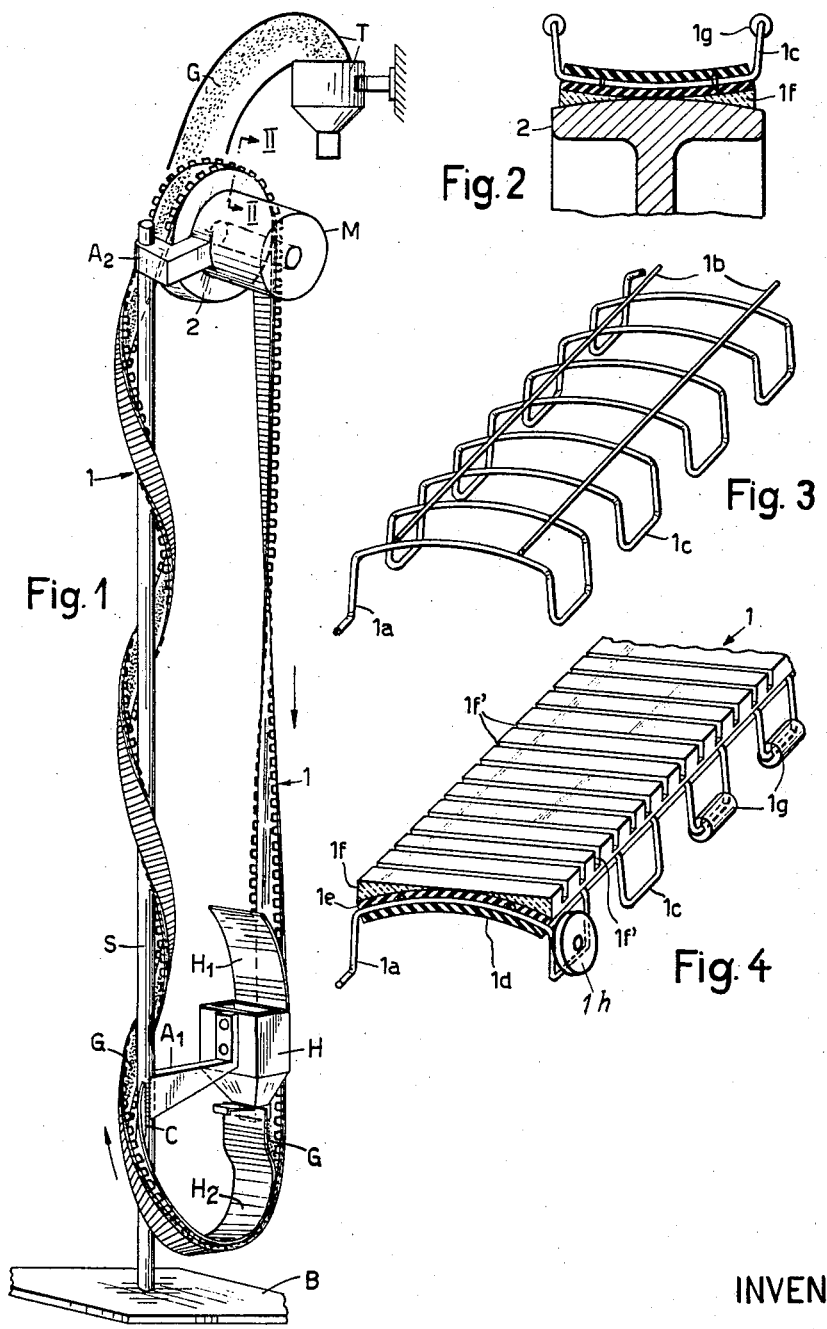

2,852,126

CENTRIFUGAL BELT CONVEYER

Karl-Heinz Ohlberg, Brendlorenzen über Bad Neustadt, Germany

Application February 28, 1957, Serial No. 648,757

5 Claims. (Cl. 198—136)

My present invention relates to improvements in centrifugally operating elevating belt conveyers as have been proposed for elevating in particular loose bulk goods, and of which an example has been shown and described in U. S. Patent No. 1,226,730, dated May 22, 1917.

In contradistinction to such known examples, the working or elevating strand of the centrifugal belt conveyer disclosed by my present invention operates in free helical flight, i. e. without the aid of idlers and like guide means, and thus is much less expensive to construct and to operate, as the number of moving parts is very much reduced.

One form of the present invention is shown, by way of example, in the accompanying drawing, in which—

Fig. 1 is a perspective schematical view of the conveyer in operation, Fig. 2 is a section on the line II—II of Fig. 1 in a larger scale, Fig. 3 is a perspective view of the belt wire-skeleton, and Fig. 4 is a similar view of the belt as used.

In Fig. 1 the working or elevating strand of an endless belt 1 is climbing at relatively high speed in a plurality of helical turns upwardly about a stand S which is fixed to a base B. The goods G to be elevated, here depicted as a loose granular material, are fed from a hopper H and carried upwardly by the climbing belt to a point approximately at the level of an upper arm A2 of stand S, whence they are flung upwardly away from belt 1 and collected in a trap T which, for example, is fixed to a building wall. Hopper H is fixed to an arm A1 which in turn is fixed to stand S. Arm A2 carries an electric motor M of which the shaft carries a crowned pulley 2 for driving belt 1. From pulley 2, belt 1 runs more or less vertically downwards to hopper H where it is again loaded. An apron H1 fixed to hopper H to project upwardly therefrom, serves for properly guiding and spacing belt 1 from the hopper rear wall. A second apron H2 fixed to the hopper underside gradually is twisted helically in its plane and at C is fixed to stand S for properly guiding belt 1 at the start of its helical flight.

It is quite obvious that belt 1 has to be readily flexible, being subjected to pronounced bending stresses at the level of arm A2 and at a point substantially halfway between pulley 2 and hopper H. Belt 1 comprises a skeleton made of a single wire 1a which forms legs 1c, and two tension wires 1b which may be welded to wire 1a.

In order to protect the legs 1c from excessive wear on the two hopper aprons H1 and H2 and also on stand S when starting and stopping the conveyer, said legs carry replaceable shoes 1g or rolls 1h. The skeleton shown in Fig. 3 is embedded in two arched rubber layers 1d and 1e, and a third layer 1f is bonded to layer 1e and presents a flat surface provided with transverse grooves 1f' as shown in Fig. 4.

It will be noted that the lower or concave side of belt 1 carries the goods, while the upper or flat and transversely-grooved side of the belt is engaged by driving pulley 2. The legs 1c of belt 1 slidingly engage portions of the hopper aprons H1 and H2 in operation, and some of them abut against stand S when the belt is out of operation.

I claim:

1. A centrifugally-operated elevating belt conveyor comprising a stand fixedly mounted on a base adapted to be set on a floor or the like, said stand having a lower and an upper arm, a hopper fixed to the lower arm for discharging goods on to the conveyor, said hopper having belt-conducting and spacing aprons, a pulley rotatably mounted on said upper arm, power means fixedly mounted on said upper arm for rotating said pulley, and an endless conveyor belt for elevating the goods, said belt being trained over said pulley and downwardly along said aprons and in a plurality of helical turns upwardly and loosely about said stand so as to move in operation when loaded by said goods in a free helical upward flight about said stand and with its load-carrying side facing the latter, and said belt being flexed in its plane through substantially 90° when leaving the stand and approaching said pulley so that the goods carried thereby are flung upwardly away from the belt by centrifugal force to be collected in a trap.

2. An elevator as set out in claim 1, in which the pulley is situated at the uppermost point of the belt travel, and the belt enters into its helical path when leaving the lowermost point of the belt travel.

3. An elevator as set out in claim 2, in which the hopper is situated on the side of the descending strand of the belt and some distance above the lowermost point of the belt travel.

4. In an elevator as set out in claim 1, an endless belt structure comprising a wire skeleton and a rubber envelope therefor, said skeleton comprising a wire bent as shown to leave lateral legs projecting from one side of said structure, and said envelope comprising a concave first side and a flat transversely grooved second side, said first side carrying the goods and said second side being engageable by the pulley.

5. An elevator belt as set out in claim 4, in which the wire skeleton additionally comprises two longitudinal wires welded to the bent wire.

References Cited in the file of this patent

UNITED STATES PATENTS 1,454,377    Grant  ------------------ May 8, 1923